(12) United States Patent
Reckemeier et al.

(10) Patent No.: US 12,741,813 B2
(45) Date of Patent: Sep. 22, 2026

(54) SYSTEM FOR STORAGE OF GOODS CARRIERS

(71) Applicant: Dematic GmbH, Heusenstamm (DE)

(72) Inventors: Hartwig Reckemeier, Rodgau (DE); Nicolas Michels, Frankfurt a.M. (DE); Sebastian Müller, Dieburg (DE); Sven Hofmann-Maßberg, Dreieich (DE); Traian Gligor, Krombach (DE)

(73) Assignee: Dematic GmbH, Heusenstamm (DE)

( * ) Notice: Subject to any disclaimer, the term of this patent is extended or adjusted under 35 U.S.C. 154(b) by 669 days.

(21) Appl. No.: 18/042,403

(22) PCT Filed: Aug. 16, 2021

(86) PCT No.: PCT/EP2021/072752
§ 371 (c)(1),
(2) Date: Feb. 21, 2023

(87) PCT Pub. No.: WO2022/043117
PCT Pub. Date: Mar. 3, 2022

(65) Prior Publication Data

US 2023/0312249 A1 Oct. 5, 2023

(30) Foreign Application Priority Data

Aug. 24, 2020 (EP) .................................... 20192437

(51) Int. Cl.
*B65G 1/04* (2006.01)
*B65G 1/06* (2006.01)

(52) U.S. Cl.
CPC .......... *B65G 1/0492* (2013.01); *B65G 1/065* (2013.01); *B65G 2201/0258* (2013.01)

(58) Field of Classification Search
CPC ................. B65G 1/0492; B65G 1/065; B65G 2201/0258
See application file for complete search history.

(56) References Cited

U.S. PATENT DOCUMENTS 4,743,157 A 5/1988 Takatsuki
4,856,956 A 8/1989 Zur
(Continued)

FOREIGN PATENT DOCUMENTS

CN 204660575 U 9/2015
CN 206265692 U 6/2017
(Continued)

OTHER PUBLICATIONS

International Search Report and Written Opinion from corresponding Patent Cooperation Treaty (PCT) Application No. PCT/EP2021/072752, completed Nov. 17, 2021.

*Primary Examiner* — Saul Rodriguez
*Assistant Examiner* — Ashley K Romano
(74) *Attorney, Agent, or Firm* — Gardner, Linn, Burkhart & Ondersma LLP

(57) ABSTRACT

A system for storage of goods carriers with a rack having storage shelves for the goods carriers on multiple levels, with a rack-servicing machine for storage of goods carriers into the storage shelves and for discharge of goods carriers from the storage shelves. The rack-servicing machine runs along tracks extending the longitudinal extension of the rack, preferably in an aisle between two racks, and is configured to service at least one level, where the storage shelves are formed with ledgers having guide strips.

15 Claims, 5 Drawing Sheets

(56) References Cited

U.S. PATENT DOCUMENTS

| | | | | |
|---|---|---|---|---|
| 7,991,505 | B2 | 8/2011 | Lert, Jr. et al. | |
| 11,407,587 | B1 * | 8/2022 | Dwivedi | B65G 1/0435 |
| 12,214,978 | B1 * | 2/2025 | Smith | B65G 1/065 |
| 12,312,171 | B2 * | 5/2025 | Aljallis | B65G 1/06 |
| 2011/0008138 | A1 | 1/2011 | Yamashita | |
| 2022/0144543 | A1 * | 5/2022 | Austrheim | B60L 53/16 |
| 2023/0137545 | A1 * | 5/2023 | Austrheim | B65G 1/0485 414/279 |
| 2023/0145619 | A1 * | 5/2023 | Li | B65G 1/1373 700/214 |
| 2023/0192404 | A1 * | 6/2023 | Sharp | B65G 1/0464 700/218 |
| 2023/0322489 | A1 | 10/2023 | Reckemeier et al. | |
| 2025/0136154 | A1 * | 5/2025 | Austrheim | B65G 1/0464 |

FOREIGN PATENT DOCUMENTS

| | | | |
|---|---|---|---|
| CN | 208307631 | U | 1/2019 |
| CN | 110949931 | A | 4/2020 |
| DE | 4339056 | A1 | 5/1995 |
| DE | 102008026326 | A1 | 12/2009 |
| DE | 202011102596 | U1 | 11/2011 |
| EP | 0776308 | B1 | 11/2000 |
| EP | 1698573 | B1 | 1/2008 |
| ES | 2403759 | A1 | 5/2013 |
| JP | 2000118644 | A | 4/2000 |
| JP | 2001240212 | A | 9/2001 |
| JP | 2006160496 | A | 6/2006 |
| JP | 2006206270 | A | 6/2011 |
| WO | 2009079678 | A1 | 7/2009 |
| WO | 2015027261 | A1 | 3/2015 |

* cited by examiner 9
11
10
2A
2C
2

12
11
2
12
2C
2B
13

SYSTEM FOR STORAGE OF GOODS CARRIERS

CROSS REFERENCE TO RELATED APPLICATION

The present application claims the priority benefits of International Patent Application No. PCT/EP2021/072752, filed on Aug. 16, 2021, and claims benefit of EP20192437.0, filed Aug. 24, 2020.

BACKGROUND AND FIELD OF THE INVENTION

The invention relates to a system for storage of goods carriers.

The use of goods carriers (trays, containers, totes etc.) for storage and handling of goods in order fulfilment systems is known.

They allow the standardization of material handling processes and devices even for small goods, which could otherwise not be handled in an automated fashion.

EP 1 698 573 B1 discloses an automated storage system for storing and picking articles and a corresponding method, in which there is provided a device for separating supplied articles into packing units and for transferring them onto trays, a tray store for storing the packing units on the trays, removal-conveyance technology for removal and for provision of the packing units sequenced for loading onto order-load carriers, and a loading station for loading the packing units onto the order-load carriers. Therefore, continuously flat tray-shaped load carriers, so-called trays, are used for transporting and storing all articles or packing units.

EP 0 776 308 B1 likewise discloses a picking method, in which flat tray-shaped load carriers are continuously used. In the described picking method, distribution units which comprise at least one but preferably several units and are compiled in an article-specific way are compiled into several large units comprising such distribution units, wherein the distribution units are taken from the arriving large units and intermediately stored, whereupon from these intermediately stored distribution units the individual orders are compiled and put into transport containers. The distribution units are each placed one-by-one on a respective goods carrier provided with a code and the data of the distribution unit located on the relevant goods carrier are supplied to a computer and are allocated to the goods carrier receiving this distribution unit and then the goods carriers are inserted into storage containers and are transported with the storage containers and intermediately stored, after which the distribution units of different goods which are each intended for a specific order, together with the goods carriers carrying the same are removed from the storage containers with the help of a computer and inserted into consignment containers and brought with the same to a removal station where they are removed, again with the help of a computer, from the consignment containers according to a predetermined packing order.

DE 20 2011 102 596 U1 discloses a fastening system for the construction of a rack storage, in particular a high rack storage, in which longitudinal rails fastened to supports as well as transverse rails are present, which determine the distance of the longitudinal rails from each other and thereby form a ladder-like horizontal framework. The distance between two transverse rails determines a compartment width for the load. The transverse rails may be fastened to the longitudinal rails by use of a safety bar, which is hooked from above into the rails connecting and fastening them.

The trays in these systems have flat bottoms that slide along the shelves when being stored and/or discharged. To improve this sliding process and reduce wear the surfaces of the shelves are often coated with friction reducing coatings (low friction coefficient). If the trays are placed into storage for an undetermined time period, forces, mainly caused by vibration in the rack, may lead to change of position and/or orientation of the trays. This however leads to difficulties when performing the discharge operation as the rack servicing machines, e.g. shuttles, rely on the initial positioning. Therefore such a shift of position and/or orientation of the trays or good carriers generates discharge errors.

SUMMARY OF THE INVENTION

The present invention provides a system in which discharge errors are at least reduced and preferably done away with.

It has been recognized that if the storage shelves are formed with ledgers having guide strips, it is possible to stop goods carriers from shifting in the storage. Furthermore, damages of shuttle parts due to collisions with shifted totes are reduced.

The ledgers are arranged perpendicular to the longitudinal extension of the rack. The guide strips on the ledgers may be upwards facing raised beadings extending the length of the ledgers along the middle line or along the edge.

In a preferred embodiment a goods carrier is at least supported by two ledgers from below. The goods carriers will have grooves on the bottom surface configured to interlock/interface with the guide strips on the ledgers. In other words the grooves in the bottom of the goods carriers are configured to interact with the guide strips on the ledgers in that the goods carriers will slide in the ledgers but the guide strips will guide the goods carriers being within the grooves which stops shifting (change of position and/or orientation) of the goods carrier. Alternatively, when the raised beading extend along the edge, the goods carriers may have a corresponding recess along the bottom edges. In both cases it is an advantage that the guides do not extend beyond the width or footprint of the goods carriers.

If the grooves have widened ends (chamfers) the entry of the guide strips into the grooves when performing storage of the goods carriers is facilitated while the smaller main part of the grooves ensures good guiding and reduction of shifting.

The grooves will be configured to allow for tolerances in ledger position and thermal dilatation (thermal expansion) of the goods carriers. When using recesses, the guide beadings may have chamfered leading edges.

To optimize storage space the goods carriers may be full sized and half sized goods carriers. This meaning that based on footprint a two half size goods carriers are the same size as a full sized goods carrier. Similar to paper sizes, for example A5 is half of A4 size. Small goods are placed/stored on the half size goods carriers and larger goods on the full size goods carriers. Preferably only a single goods is placed on or in each goods carrier. It is however also possible to place two or more goods of same kind on or in each goods carrier.

When the grooves in the full sized goods carriers extend in longitudinal direction and the grooves in the half sized goods carriers extend in lateral direction, it is possible to store the two different sized goods carriers on the same ledgers, one lengthwise and one crosswise.

The rack-servicing machines may be single level servicing automated storage and retrieval machines of the shuttle type. These will preferably be configured to carry a single full sized goods carrier or two half size goods carriers (in rotated orientation, i.e. long side next to long side).

Preferably the goods carriers are trays, even more preferred trays of the two-piece kind. The trays used have a two-piece design that allows for safe transport and easy detraying. They comprise a frame and within that frame a moveable bottom as detailed in DE 10 2008 026 326 A1. The tray also contains lateral finger access pockets in the tray walls and bottom guide grooves. The tray is stackable respective nestable when empty. It is designed to be stacked on top of each other in a height saving manner, for automatic stacking, destacking, tray loading as well as safe stack transport and space saving for empty tray stack storage.

Further features and details of the invention will be apparent from the description hereinafter of the drawings.

DESCRIPTION OF THE PREFERRED EMBODIMENTS

Figure 1:
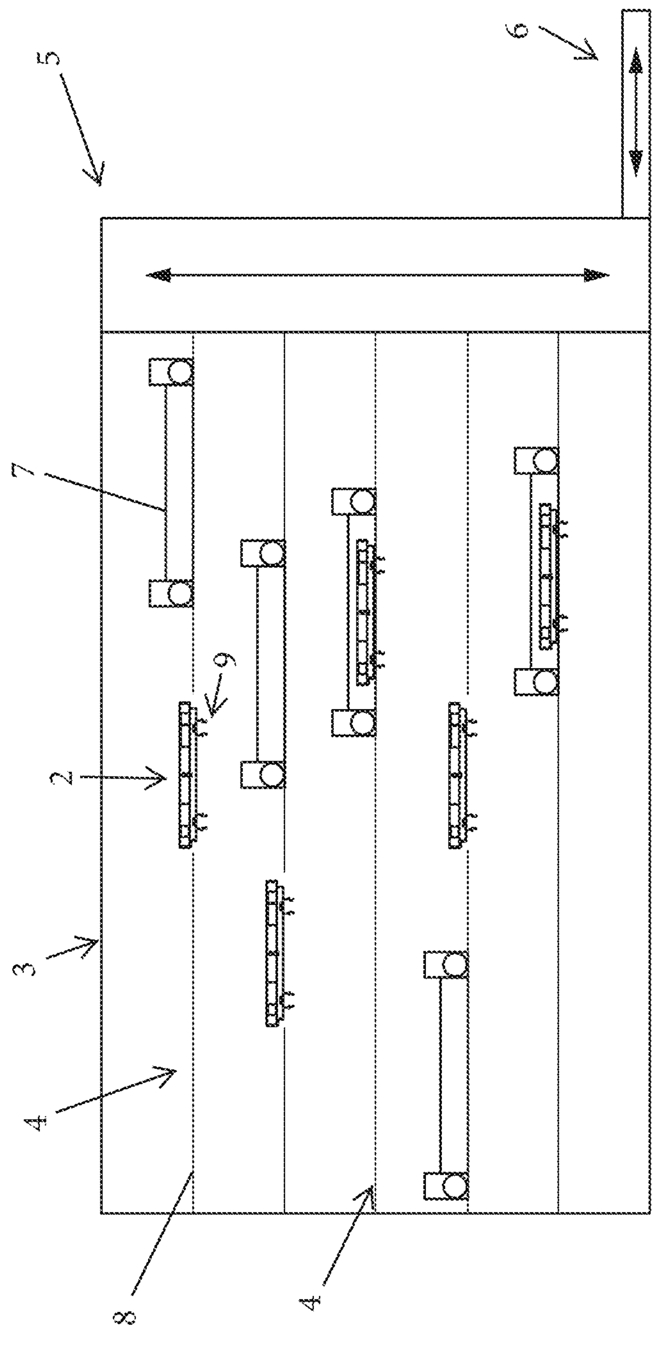
FIG. 1 shows a schematic side view of a system according to the invention.

In the figures a system designated as a whole with 1 for storage of goods carriers is shown. In the present case the goods carriers are trays 2 that are included in the system.

The trays 2 used have a two-piece design that allows for safe transport and easy detraying. They comprise a frame 2A and within that frame a moveable bottom 2B as detailed in DE 10 2008 026 326 A1.

The system includes a rack 3 having storage shelves 4 for the trays 2 on multiple levels. The rack 3 has a vertical lift 5 for vertical movement of trays 2 between levels. The trays 2 are dropped off or picked up by the rack-servicing machines besides the lift 5 on buffers (not shown) that interface with the lift 5 (or its carriage). In one level the lift 5 interfaces with a conveyor 6 for supply and discharge of trays 2 to the rack 3.

The rack-servicing machines 7 for storage of trays 2 into the storage shelves 4 and for discharge of trays 2 from the storage shelves 4 are of the shuttle type and run along tracks 8 extending the longitudinal extension of the rack 3 in an aisle between two racks 3 and are configured to service at least one level. The shuttles 7 are configured to carry a single full sized trays 2 or two half size trays 2 (in rotated orientation, i.e. long side next to long side).

The storage shelves 4 are formed with ledgers 9 having guide strips 10. The ledgers 9 are arranged perpendicular to the longitudinal extension of the rack 3 (or aisle). Two ledgers 9 support each tray 2 from below. The ledgers 9 are arranged along the storage space of each level/shelf 4 in a pattern. The guide strips 10 on the ledgers 9 are formed by upwards facing raised beadings extending the length of the ledgers 9 along the middle line.

Figure 2:
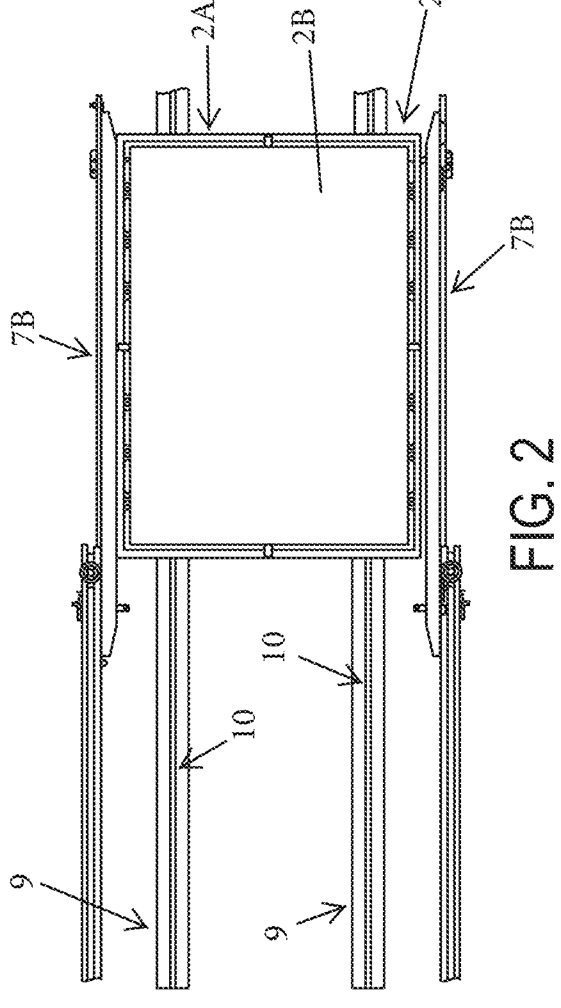
FIG. 2 shows a schematic top view of a system of FIG. 1 with a full size goods carrier being placed.
Figure 3:
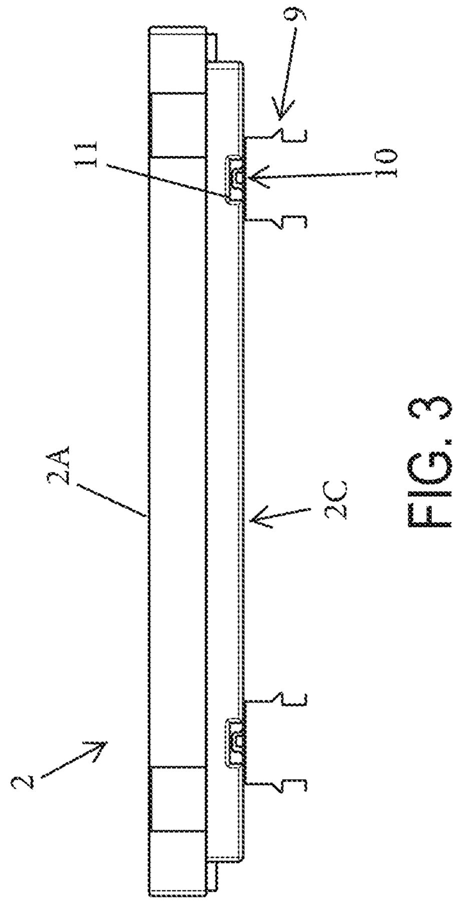
FIG. 3 shows a side view of full size goods carrier being placed on ledgers.

The trays 2 have grooves 11 on the bottom surface 2C configured to interlock/interface with the guide strips 10 on the ledgers 9 (see FIG. 3), stopping the trays 2 from shifting the position and orientation over time. The grooves 11 have widened (chamfered) ends 12 facilitating entry of the guide strips 10 when the trays 2 are placed thereon, as can be seen in FIG. 2, in which a tray 2 is being placed on ledgers 9 by telescopic arms 7B of a shuttle 7 (not shown).

As the grooves 11 have widened ends 12 (chamfers) the entry of the guide strips 10 into the grooves 11 when performing storage of the trays 2 is facilitated while the smaller main part 13 of the grooves 11 ensures good guiding and reduction of shifting. The grooves 11 are configured to allow for tolerances in ledger position and thermal dilatation (thermal expansion) of the trays.

Figure 4:
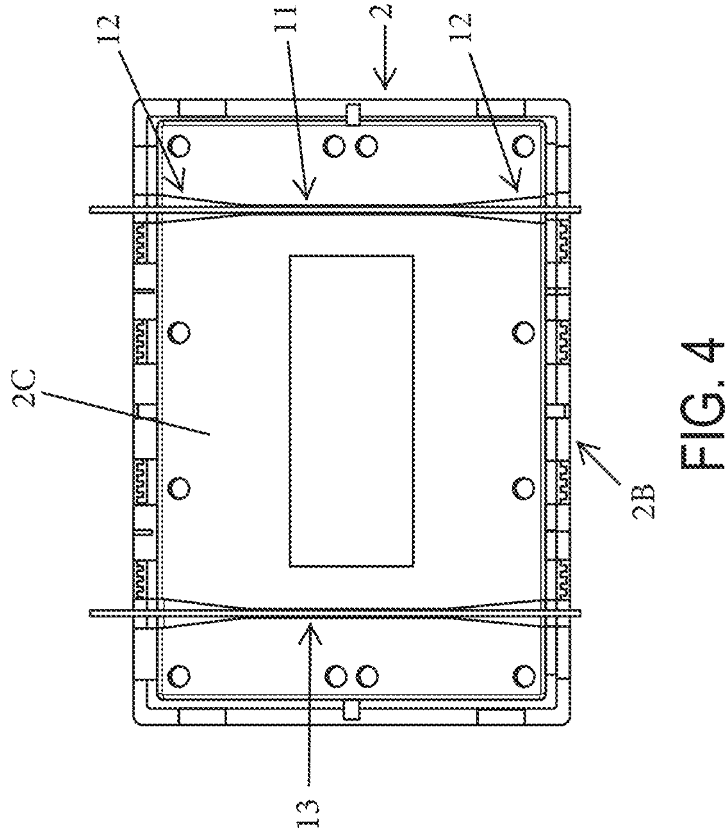
FIG. 4 shows a bottom view of a half size goods carrier with indication of guide strips.

The trays 2 are full sized (see FIG. 2) and half sized trays (see FIG. 4). The grooves 11 in the full sized trays 2 extend in longitudinal direction (see FIG. 2) and the grooves in the half sized trays (see FIG. 4) extend in lateral direction. This use allows to optimize storage space meaning that based on footprint two half size trays 2 are the same size as a full sized trays. Similar to paper sizes, for example A5 is half of A4 size.

Preferably only a single goods is placed on or in each goods carrier.

Figure 5:
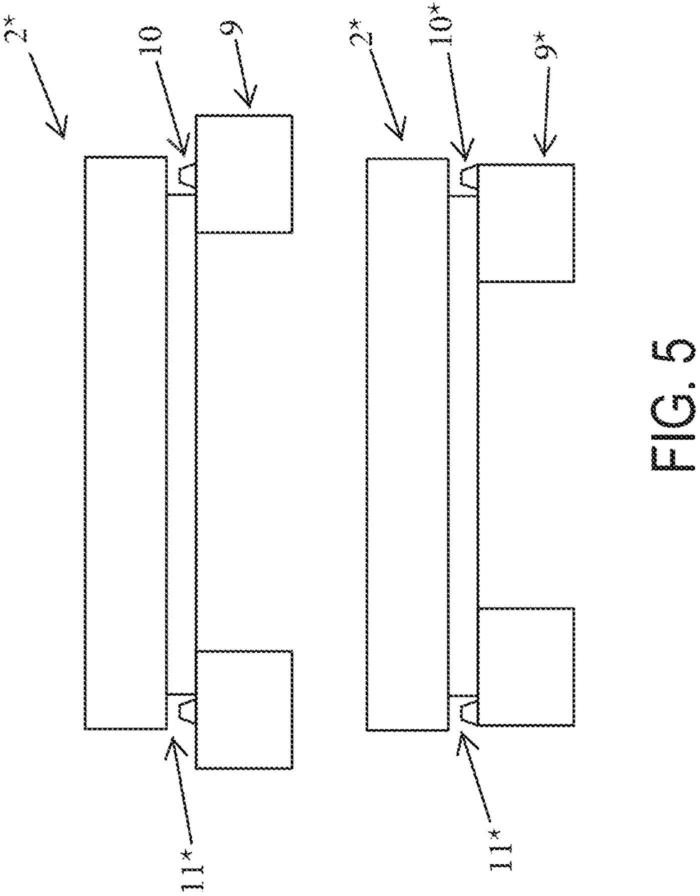
FIG. 5 shows a front view on use of guide strips extending along the edge.

In FIG. 5 a front view on use of guide strips 10* extending along the edge of the ledgers 9* is shown. The trays 2* have corresponding recesses 11* along the edges (bottom version in FIG. 5). If the ledgers 9 from above are used, then the corresponding tray 2* may be positioned as shown in the top view, but sacrificing space.

The invention claimed is:

1. A system for storage of goods carriers, said system comprising:

a plurality of goods carriers;

a longitudinally extending rack having storage shelves for the goods carriers on multiple levels;

a rack-servicing machine for storage of goods carriers into the storage shelves and for discharge of goods carriers from the storage shelves, the rack-servicing machine running along tracks extending the longitudinal extension of the rack and configured to service at least one level;

wherein the storage shelves are formed with ledgers having guide strips and wherein the ledgers are arranged perpendicular to the longitudinal extension of the rack, wherein the guide strips on the ledgers are upwards facing raised beadings extending a length of the ledgers along a middle line or along an edge, wherein two ledgers support a goods carriers from below, wherein the goods carriers have grooves on a bottom surface or a recess along bottom edges that are configured to interlock/interface with the guide strips on the ledgers to prohibit the goods carriers from shifting in the rack, and wherein the rack-servicing machine comprises a shuttle configured as a single level servicing automated storage and retrieval machine.

2. The system according to claim 1, wherein the grooves have widened ends facilitating entry of the guide strips.

3. The system according to claim 1, wherein the goods carriers comprise full sized and half sized goods carriers.

4. The system according to claim 3, further comprising grooves on a bottom surface or a recess along bottom edges of the goods carriers, wherein the grooves are configured to interlock/interface with the guide strips on the ledgers, and wherein the grooves in the full sized goods carriers extend in a longitudinal direction and the grooves in the half sized goods carriers extend in a lateral direction.

5. The system according to claim 1, further comprising a plurality of rack-servicing machines each comprising shuttles configured as single level servicing automated storage and retrieval machines.

6. The system according to claim 1, wherein the goods carriers are trays.

7. The system according to claim 1, wherein the tracks along which the rack-servicing machine runs extend in an aisle between two racks.

8. The system according to claim 1, wherein two ledgers support a goods carriers from below.

9. The system according to claim 8, wherein the goods carriers have grooves on a bottom surface or a recess along bottom edges that are configured to interlock/interface with the guide strips on the ledgers.

10. The system according to claim 9, wherein the goods carriers are trays.

11. The system according to claim 1, wherein the goods carriers have grooves on a bottom surface or a recess along bottom edges that are configured to interlock/interface with the guide strips on the ledgers.

12. The system according to claim 11, wherein the grooves have widened ends facilitating entry of the guide strips.

13. The system according to claim 11, wherein the goods carriers are trays.

14. The system according to claim 13, wherein the goods carriers comprise full sized and half sized goods carriers.

15. The system according to claim 14, wherein the grooves in the full sized goods carriers extend in a longitudinal direction and the grooves in the half sized goods carriers extend in a lateral direction.

* * * * *